(12) United States Patent
Kitami et al.

(10) Patent No.: US 7,239,890 B2
(45) Date of Patent: Jul. 3, 2007

(54) WIRELESS COMMUNICATION TERMINAL FOR AUTOMATIC MATCHING FOR WIRELESS NETWORK STANDARDS

(75) Inventors: Hideo Kitami, Kanagawa (JP); Yoshikazu Kobayashi, Kanagawa (JP)

(73) Assignee: NEC Infrontia Corporation, Kanagawa (JP)

( * ) Notice: Subject to any disclaimer, the term of this patent is extended or adjusted under 35 U.S.C. 154(b) by 565 days.

(21) Appl. No.: 10/678,064

(22) Filed: Oct. 6, 2003

(65) Prior Publication Data

US 2004/0102193 A1 May 27, 2004

(30) Foreign Application Priority Data

Nov. 25, 2002 (JP) ............................. 2002-341006

(51) Int. Cl.
*H04B 7/00* (2006.01)
(52) U.S. Cl. .................. 455/553.1; 455/41.2; 455/41.3
(58) Field of Classification Search ............... 455/41.2, 455/41.3, 500, 552.1, 553.1, 132, 102; 370/335, 370/342, 444
See application file for complete search history.

(56) References Cited

U.S. PATENT DOCUMENTS 6,954,446 B2 * 10/2005 Kuffner ...................... 370/335

2004/0203367 A1 * 10/2004 Nowlin ...................... 455/41.2

FOREIGN PATENT DOCUMENTS

| JP | 08-008992 | 1/1996 |
|---|---|---|
| JP | 11-88371 A | 3/1999 |
| JP | 11-331183 | 11/1999 |
| JP | 2002-112347 A | 4/2002 |
| JP | 2002-271338 A | 9/2002 |

\* cited by examiner

*Primary Examiner*—Sanh D. Phu
(74) *Attorney, Agent, or Firm*—Foley & Lardner LLP

(57) ABSTRACT

A wireless communication terminal comprising antennas 4, 5 for receiving signals based on first and second wireless LAN standards, RF circuits 10, 13 for receiving the signals from the antennas 4, 5, a switch 16 for switching the standards of the signals received by the RF circuits to each other, reception level judging portions 12, 15 for judging the reception level of the signals in the RF circuits 10, 13 in the priority order from the highest standard to the lowest standard, and a controller 17 for judging on the basis of the judgment result of the reception level by the reception level judging portions whether it is possible to carry out the communications based on the first or second standard and control the switching operation of the switch so that the communications based on the standard having a higher priority can be carried out.

8 Claims, 11 Drawing Sheets

WIRELESS COMMUNICATION TERMINAL FOR AUTOMATIC MATCHING FOR WIRELESS NETWORK STANDARDS

BACKGROUND OF THE INVENTION

1. Field of the Invention

The present invention relates to a wireless communication terminal for automatic matching for wireless network standards, a wireless base station, a wireless communication network system and an automatic matching method for wireless network standards and particularly, to a wireless communication terminal, a wireless base station, a wireless communication network system and an automatic matching method for wireless network standards, wherein signals based on plural wireless network standards are received and automatic matching is carried out on the signals thus received.

2. Description of the Related Art

For example, JP-A-8-8992 is known as a technique relating to this invention in a wireless communication network system. JP-A-8-8992 discloses that plural stages are set for the rate matching, and a rate matching function is dispersed to a mobile station side and a base station side for wireless communications like a mobile station is equipped with first rate matching means for converting information having an information transfer rate of 64 Kbit/s or less from a non-ISDN terminal to information having an information transfer rate of $2^n \times 8$ Kbit/s (n=0, 1, 2, . . . ) and also a base station of wireless communications is equipped with second rate matching means for matching the information of $2^n \times 8$ Kbit/s with the information transfer rate of the ISDN line which is equal to 64 Kbbit/s.

SUMMARY OF THE INVENTION

The present invention has an object to provide a wireless communication terminal, a wireless base station, a wireless communication network system and an automatic matching method for wireless network standards, wherein even when a physical trouble occurs in a base station or terminal station module using a wireless network standard or the intensity of received electric wave based on a wireless network standard is reduced or the like, communications based on another wireless network standard can be performed.

In order to attain the above object, according to a first aspect of the present invention, there is provided a wireless communication terminal comprising: antenna means for receiving signals based on plural wireless network standards; transmitting/receiving means for receiving the signals from the antenna means; switching means for switching the wireless network standards of the signals received by the transmitting/receiving means to one another; reception level judging means for judging the reception level of each of the signals received by the transmitting/receiving means in the priority order of the wireless network standards from the highest-priority wireless network standard to the lowest-priority wireless network standard in the plural wireless network standards; and control means for judging on the basis of the judgment result of the reception level by the reception level judging means whether it is possible to carry out communications based on any one of the plural wireless network standards, and controlling the switching operation of the switching means so that the communications based on the highest-priority wireless network standard can be carried out.

According to a second aspect of the present invention, there is provided a wireless communication terminal comprising: antenna means for receiving signals based on at least two wireless network standards; transmitting/receiving means for receiving the signals from the antenna means; switching means for switching the wireless network standards of the signals received by the transmitting/receiving means to one another; first reception level judging means for judging the reception level of a signal that is received by the transmitting/receiving means and based on a first wireless network standard having the highest priority in the two wireless network standards; second reception level judging means for judging the reception level of another signal that is received by the transmitting/receiving means and based on a second wireless network standard having a priority lower than the first wireless network standard; and control means for judging on the basis of the judgment result of the reception level by the first reception level judging means whether it is possible to carry out communications based on the first wireless network standard, judging on the basis of the judgment result of the reception level by the second reception level judging means whether it is possible to carry out communications based on the second wireless network standard when it is judged that it is impossible to carry out the communications based on the first wireless network standard, and controlling the switching operation of the switching means so that communications based on a wireless network standard having the highest priority can be carried out.

According to a third aspect of the present invention, there is provided a wireless communication network system comprising a wireless communication terminal, and a wireless base station for carrying out communications based on plural wireless network standards with the wireless communication terminal, wherein the wireless base station transmits to the wireless communication terminal the throughput of communications based on each wireless network standard, or the number of wireless communication terminals carrying out communications based on each wireless network standard and the throughput of the communications based on each wireless network standard, and the wireless communication terminal has means for notifying, to the user of the wireless communication terminal, the throughput of communications based on each wireless network standard thus received or the number of wireless communication terminals carrying out communications based on each wireless network standard and the throughput of the communications based on each wireless network standard thus received, the user judging the shift from the wireless network standard of the communications being currently carried out to another wireless network standard.

According to a fourth aspect of the present invention, there is provided a wireless base station for communicating with a wireless communication terminal on the basis of signals based on plural wireless network standards, comprising: antenna means for carrying out communications on the basis of signals based on at least two wireless network standards; transmitting/receiving means for transmitting/receiving the signals by the antenna means; and means for judging the shift from the wireless network standard of communications being carried out to another wireless network standard on the basis of the throughput of communications based on each wireless network standard through the transmitting/receiving means or on the basis of the number of wireless communication terminals carrying out the communications based on each wireless network standard through the transmitting/receiving means and the throughput of communications based on each wireless network standard.

According to a fifth aspect of the present invention, there is provided An automatic matching method for wireless network standards, comprising the steps of: receiving signals based on plural wireless network standards by antenna means; judging the reception level of signals in transmitting/receiving means connected to the antenna means in the priority order from the highest wireless network standard to the lowest wireless network standard in the plural wireless network standards; judging on the basis of a judgment result of the reception level whether it is possible to carry out communications based any one of the plural wireless network standards; and controlling the transmitting/receiving means so that communications based on a wireless network standard having higher priority can carry out.

DETAILED DESCRIPTION OF THE PREFERRED EMBODIMENTS

Preferred embodiments according to the present invention will be described hereunder with reference to the accompanying drawings.

First Embodiment

Figure 1:
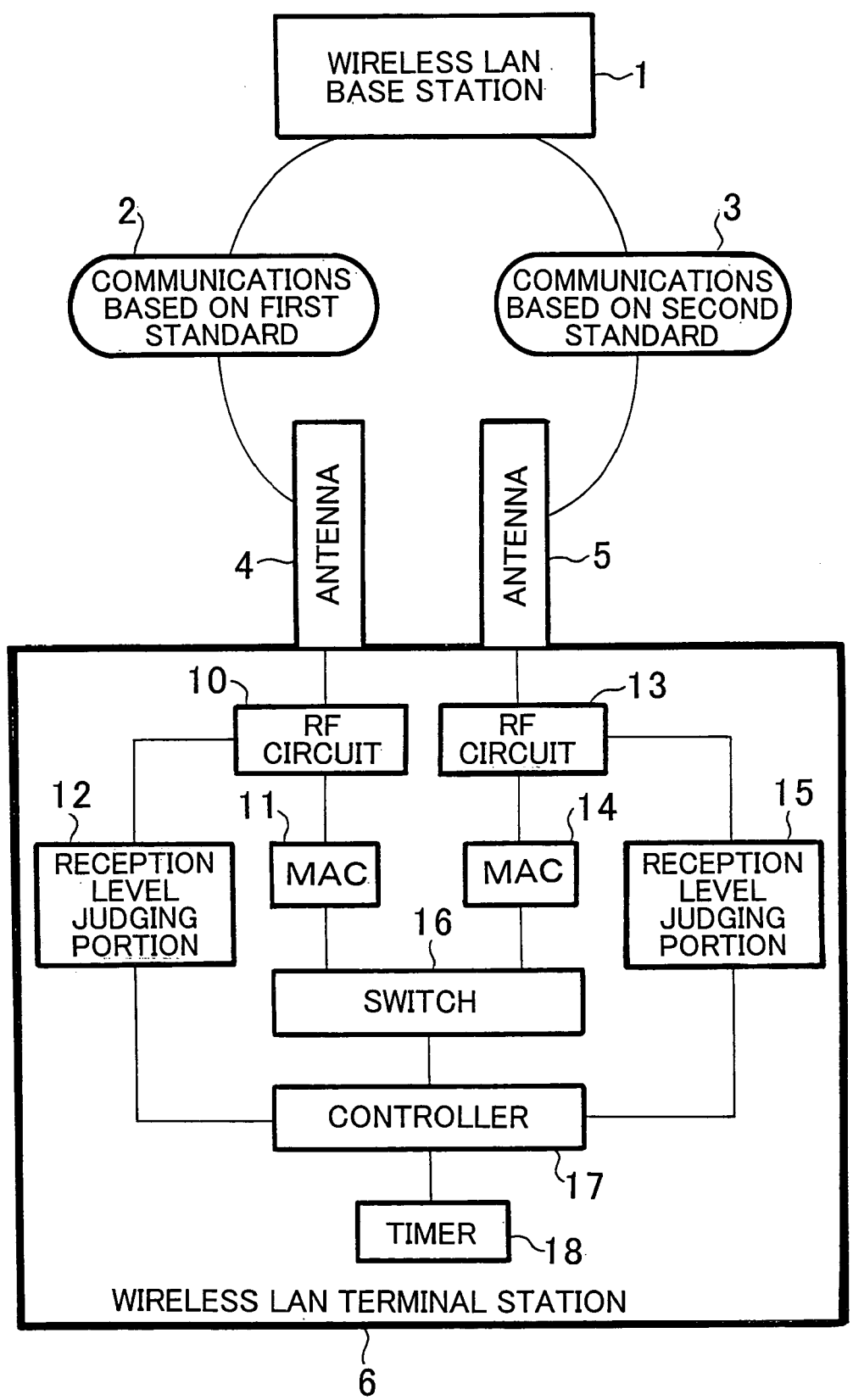
FIG. 1 is a block diagram showing a wireless communication network system and a wireless communication terminal according to a first embodiment of the present invention.

FIG. 1 is a block diagram showing a wireless communication network system according to a first embodiment according to the present invention.

In FIG. 1, wireless LAN base station 1 and wireless LAN terminal station 6 can make communications based on two wireless LAN standards serving as wireless network standards, that is, they can make communications 2 based on a first wireless LAN standard ("wireless LAN standard" will be hereinafter merely referred to as "standard"), and communications 3 based on a second standard. The wireless LAN terminal station 1 cannot simultaneously make both the communications based on the two standards, and it can communicate with the wireless LAN terminal station 6 by selecting one of the first standard and the second standard.

Here, the first standard is assumed as an upper class standard having a high communication efficiency, and the second standard is assumed as a lower class standard having a lower communication efficiency than the first standard. For example, IEEE802.11a is known as the first standard, and IEEE802.11b is known as the second standard.

IEEE802.11a is one of wireless LAN standards settled by the 802 Committee which formulates the standard of the LAN technique in IEEE (Institute of Electrical and Electronics Engineers). It has a high-speed specification using 5.2 GHz band, uses a frequency band around the 5.2 GHz band, and adopts the OFDM system as a modulation system and CSMA/CA as an MAC layer like IEEE802.11. The transmission rate is equal to 36 to 54 Mbps, and it is more greatly increased as compared with about 2 Mbps in the case of the initial standard of IEEE802.11 and about 11 Mbps in the case of IEEE802.11b. IEEE802.11b is also known as IEEE802.11 High-Rate. This is a standard of measure of wireless LAN formulated by IEEE and constitutes a part of the Ethernet (registered trademark) standard, and uses electric waves of 2.4 GHz band (ISM band) which is freely usable with no radio license. According to this standard, communications can be carried out between terminals at a distance of 50 m to 100 m at a rate of 11 Mbps.

The wireless LAN terminal station 6 comprises antennas 4, 5, RF circuits 10, 13 connected to the antennas 4, 5 respectively, MAC circuits 11, 14 connected to the RF circuits 10, 13 respectively, reception level judging portions 12, 15 connected to the RF circuits 10, 13 respectively, switch 16 connected to the Media Access Control (MAC) circuits 11, 14, timer 18 and controller 17 for controlling the operation of the whole. The RF circuits 10, 13 and the MAC circuits 11, 14 constitute transmitting/receiving means.

The antenna 4 and the antenna 5 serve to transmit/receive electric waves for wireless LAN communications based on the first standard and the second standard, respectively.

The Radio Frequency (RF) circuit 10 and the RF circuit 13 serve to transmit/receive electric waves for wireless LAN communications based on the first and second standards, respectively.

The MAC circuit 11 and the MAC circuit 14 serve to carry out the MAC processing of the wireless LAN communications based on the first and second standards, respectively.

The switch 16 is connected to the MAC circuit 11 and the MAC circuit 14, and serve to switch the wireless LAN communications between the wireless LAN communications based on the first standard and the wireless LAN communications based on the second standard.

The controller 17 serves to control the overall operation of the wireless LAN terminal station 6.

The reception level judging portions 12, 15 serve to judge the intensity of received electric waves for the wireless LAN communications based on the first and second standards, respectively.

In the wireless LAN terminal station 6, priorities are given in the order from the first standard to the second standard. Accordingly, after the wireless LAN terminal station 6 is started, the value of the reception level judging portion 12 is read, and when the intensity of the received electric waves based on the first standard is excellent, the communications based on the first standard is carried out.

If there is no problem in communications based on the first standard to the wireless LAN base station 1, the communications based on the first standard is continued until any problem occurs.

If it is judged on the basis of the judgment of the reception level judging portion 12 that it is impossible to carry out the communications based on the first standard, or if any error occurs in the communications based on the first standard although no problem is judged by the reception level judging portion 12, the value of the reception level judging portion 15 is read, and if the intensity of received electric waves based on the second standard is excellent, the controller 17 control the switches 16 to the second standard side, and carries out the communications based on the second standard.

The timer 18 transfers interrupt signal to the controller 17 after a fixed time elapses.

When the interrupt signal from the timer 18 is input, the controller 17 reads the value of the reception level judging portion 12. If the intensity of received electric waves based on the first standard is excellent, the controller 17 controls the switch 16 to switch from the second standard to the first standard, and attempt the communications based on the first standard.

(Description of Operation)

Next, the automatic matching operation between wireless LAN standards of the wireless LAN terminal station 6 of FIG. 1 will be described with reference to the flowchart of FIG. 2.

Figure 2:
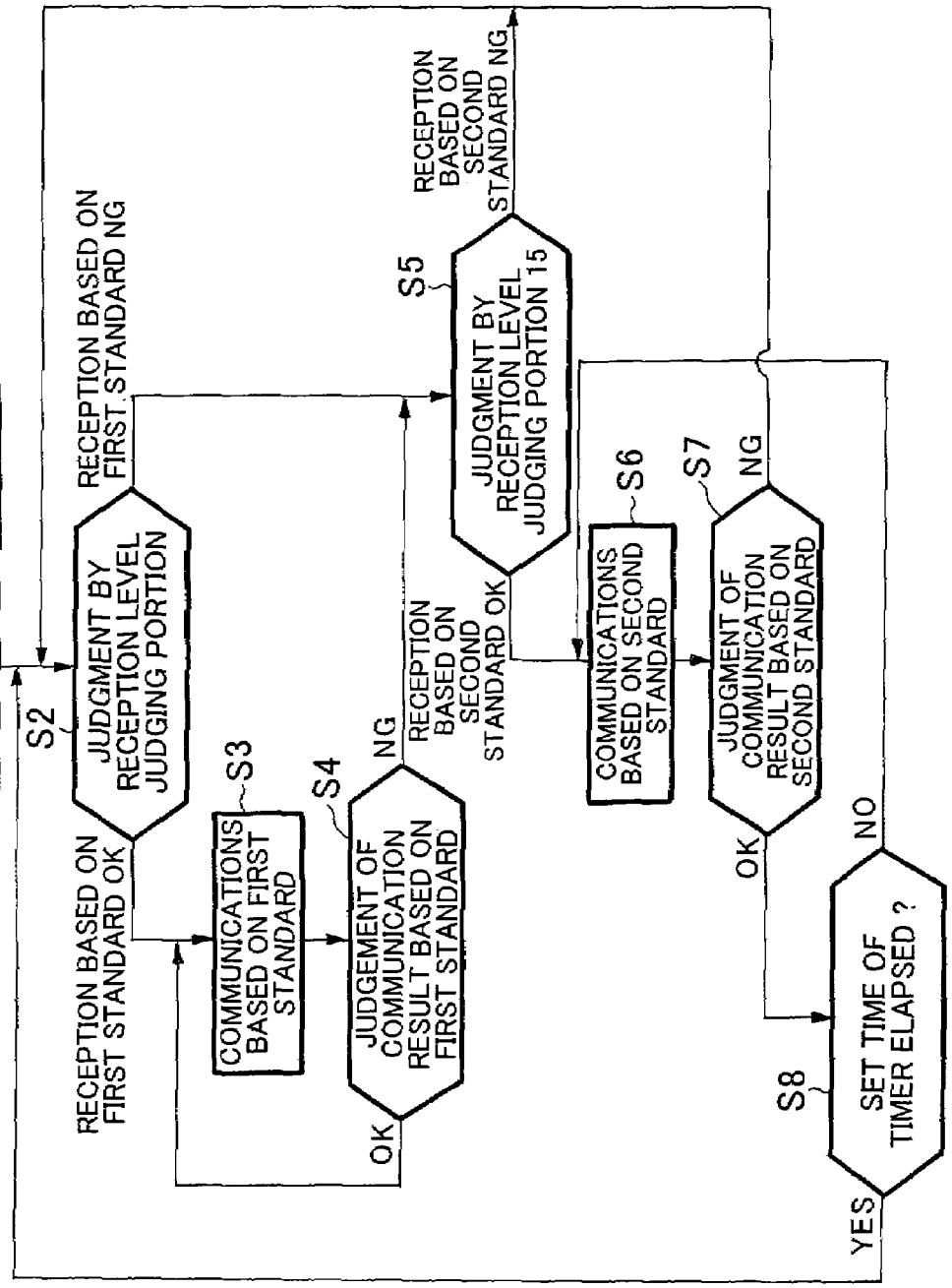
FIG. 2 is a flowchart showing the automatic matching operation between wireless LAN standards of a wireless LAN terminal station 6.

In FIG. 2, when the wireless LAN terminal station 6 is started (step S1), the controller 17 controls the reception level judging portion 12 to make a judgment (step S2). If the reception based on the first standard is possible (OK), the communications based on the first standard is carried out (step S3). In this case, since the first standard has priority over the second standard, the switch 16 is switched to the first standard when the wireless LAN terminal station 6 is started.

If it is judged by the reception level judging portion 12 that the reception based on the first standard is impossible (NG) (step S2), the controller 17 goes to the judgment of the reception level judging portion 15 (step S5).

After the communications based on the first standard, the controller 17 judges the communication result based on the first standard(step S4). If the communications based on the first standard is OK, the controller 17 would repeat the communications based on the first standard. On the other hand, if the communications based on the first standard is impossible (NG), the controller 17 would go to the judgment of the reception level judging portion 15 (step S5). If the judgment of the reception level judging portion 15 indicates that the reception based on the second standard is OK, the controller 17 would go to the communications based on the second standard (step S6). On the other hand, if the reception based on the second standard is NG (step S7), the controller 17 returns to the judgment of the reception level judging portion 12.

After the communications based on the second standard is made, the communication result based on the second standard is judged (step S7). If the communications concerned is OK, the processing goes to a judgment as to whether the set time of the timer 18 has elapsed (step S8). If the set time has elapsed (YES), the processing returns to the judgment of the reception level judging portion 12.

If the set time has not yet elapsed (NO), the communications based on the second standard is repeated.

In the foregoing description, the operation using the two standards has been described. However, in the case of three or more standards, the automatic matching between plural standards can be performed by giving priorities in standard to the wireless LAN terminal station and judging in the priority order every set time of the timer whether the communications based on the standard concerned can be performed.

In FIG. 1, the antenna, the RF circuit and the MAC circuit are equipped every standard, however, one or two of these parts may be commonly used as a common part in accordance with the standards. In this case, for example, a signal based on the first standard received from the common antenna may be subjected to the signal processing in the first RF circuit and the first MAC circuit while a signal based on the second standard received from the common antenna is subjected to the signal processing in the second RF circuit and the second MAC circuit. As another example, a signal based on the first standard from the first antenna and a signal based on the second standard from the second antenna may be subjected to signal processing in the common RF circuit and the common MAC circuit.

In FIG. 1, the wireless LAN base station 1 are adapted to both the first and second standards, however, the same construction can be applied even when different wireless LAN base stations are adapted to the first and second standards, respectively.

According to this embodiment, in the communications between the base station and the terminal station in the wireless LAN, the switching operation of the standard is judged on the basis of the priority set at the wireless LAN terminal station every set time of the timer, and thus plural standards can be automatically matched.

Second Embodiment

Figure 3:
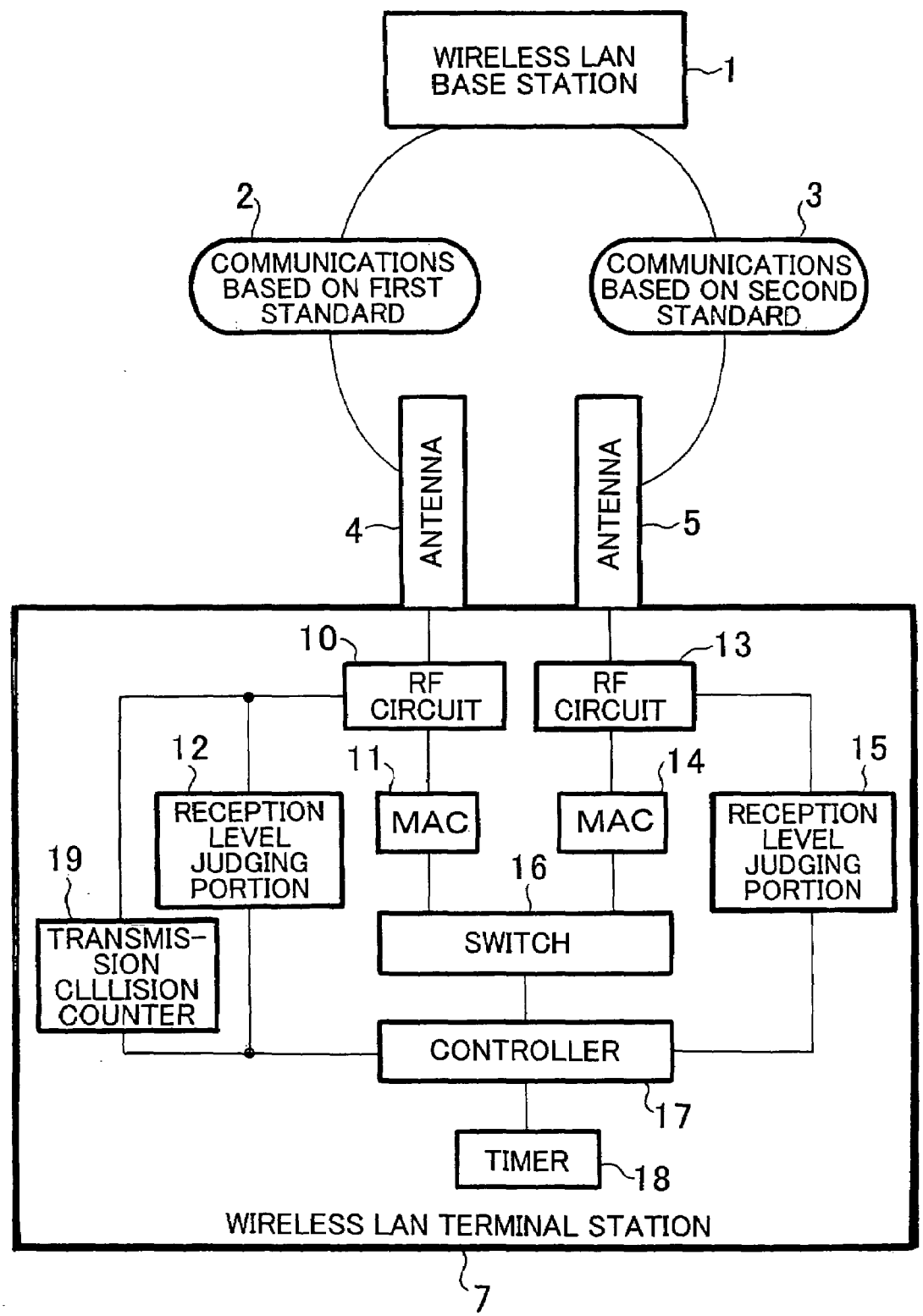
FIG. 3 is a block diagram showing a wireless communication network system and a wireless communication terminal according to a second embodiment of the present invention.

A second embodiment of the present invention has the same basic construction as described above, however, it is improved in communication efficiency. FIG. 3 shows the construction of the second embodiment of the present invention. In FIG. 3, the same constituent elements as FIG. 1 are represented by the same reference numerals, and the description thereof is omitted.

In FIG. 3, a transmission collision counter 19 is equipped between the RF circuit 10 and the controller 17 in the wireless LAN terminal station 7, and the transmission collision counter 19 counts the number of the collision (the collision number) of transmission packets based on the first standard. If the transmission based on the first standard fails, the number of the collision is counted up. The count value is cleared to zero by the controller 17 if the transmission succeeds.

The count number of the transmission collision count 19 exceeds a set threshold value of the number of the collision, the transmission collision counter 19 transfer interrupt signal to the controller 17.

when the interrupt signal is input, the controller 17 controls the reception level judging portion 15 to check whether the reception based on the second standard is possible, and if it is possible, the switch 16 is switched to the second standard side to carry out the communications based on the second standard.

As described above, according to this embodiment, the number of the collision of transmission packets is newly taken into consideration. Therefore, in such a case that the communication efficiency is lowered by collision although the reception based on the first standard is possible and no error occurs in the communications, an effect of enhancing the communication efficiency can be achieved by shifting the communications based on the first standard to the communications based on the second standard.

In this embodiment, the operation based on the two standards is described above. However, the same description can be applied in the case of three or more standards.

Third Embodiment

Figure 4:
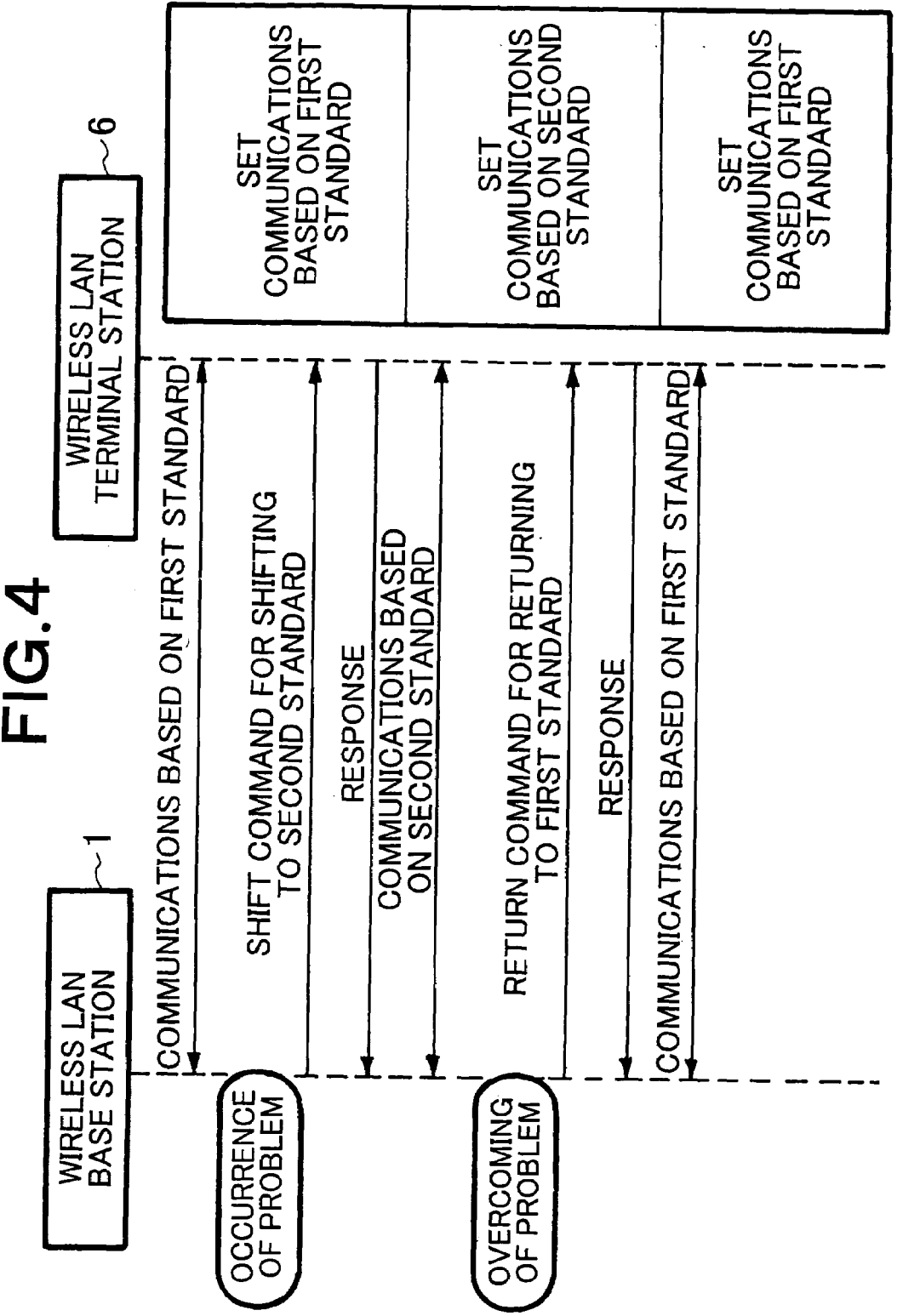
FIG. 4 is a diagram showing the operation of a wireless communication network system and a wireless communication terminal according to a third embodiment of the present invention.

In a third embodiment of the present invention, the wireless LAN base station 1 is also improved. FIG. 4 is a flowchart of the third embodiment.

This embodiment is different from the first and second embodiments in that the wireless LAN base station 1 switches the first standard and the second standard to each other.

When the wireless base station 1 and the wireless LAN terminal station 6 make communications based on the first standard and at this time a problem such as increase in the number of accommodated terminal stations based on the first standard or the like occurs in the wireless LAN base station 1, the wireless LAN base station 1 issues to the wireless LAN terminal station 6 a command for shifting to the second standard.

In response to the shift command, the wireless LAN terminal station 6 responds to the wireless LAN base station 1, and then it shifts to the second standard and starts the communications based on the second standard. When the problem of the communications based on the first standard in the wireless LAN base station 1 is overcome, the wireless LAN base station 1 issues a return command to the first standard to the wireless LAN terminal station 6.

After responding to the wireless LAN base station 1 in response to the return command, the wireless LAN terminal station 6 returns to the first standard and resumes the communications based on the first standard.

Accordingly, when it is clearly better in communication efficiency to carry out the communications based on the second standard than to carry out the communications based on the first standard, for example, when the number of accommodated terminal stations based on the first standard accommodated by the wireless LAN base station 1 is extremely larger than the number of accommodated terminal stations based on the second standard, the wireless LAN base station 1 can switch to the second standard. The wireless LAN base station 1 grasps the number of accommodated terminal stations every standard and the communication efficiency every standard at all times to control the switching operation of the communication standard of the wireless LAN terminal station 6, so that the communications having the highest communication efficiency can be performed.

The above embodiment may be modified so that in place of the shift command, the wireless LAN base station 1 may supply the wireless LAN terminal station 6 with information about both a throughput based on the first standard and an estimated throughput when the first standard is shifted to the second standard (or further added with the numbers of wireless LAN terminal stations for carrying out communications based on the first and second standards, respectively) through notifying means such as a liquid crystal display or the like, and the shift from the first standard to the second standard is judged by the user using the wireless LAN terminal station 6 while viewing the throughput information of the first and second standards.

Fourth Embodiment

Figure 5:
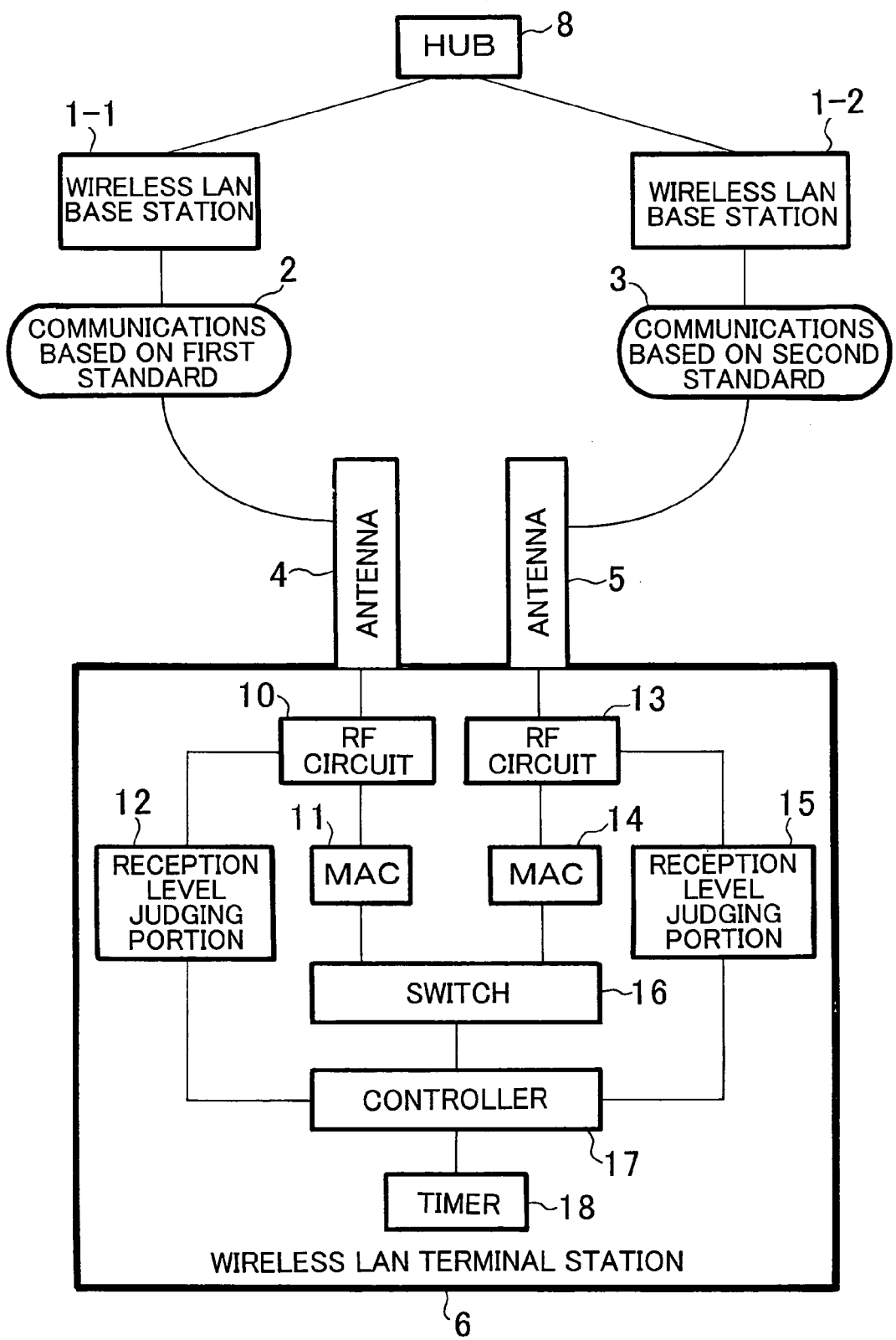
FIG. 5 is a block diagram showing a wireless communication network system and a wireless communication terminal according to a fourth embodiment of the present invention.
Figure 6:
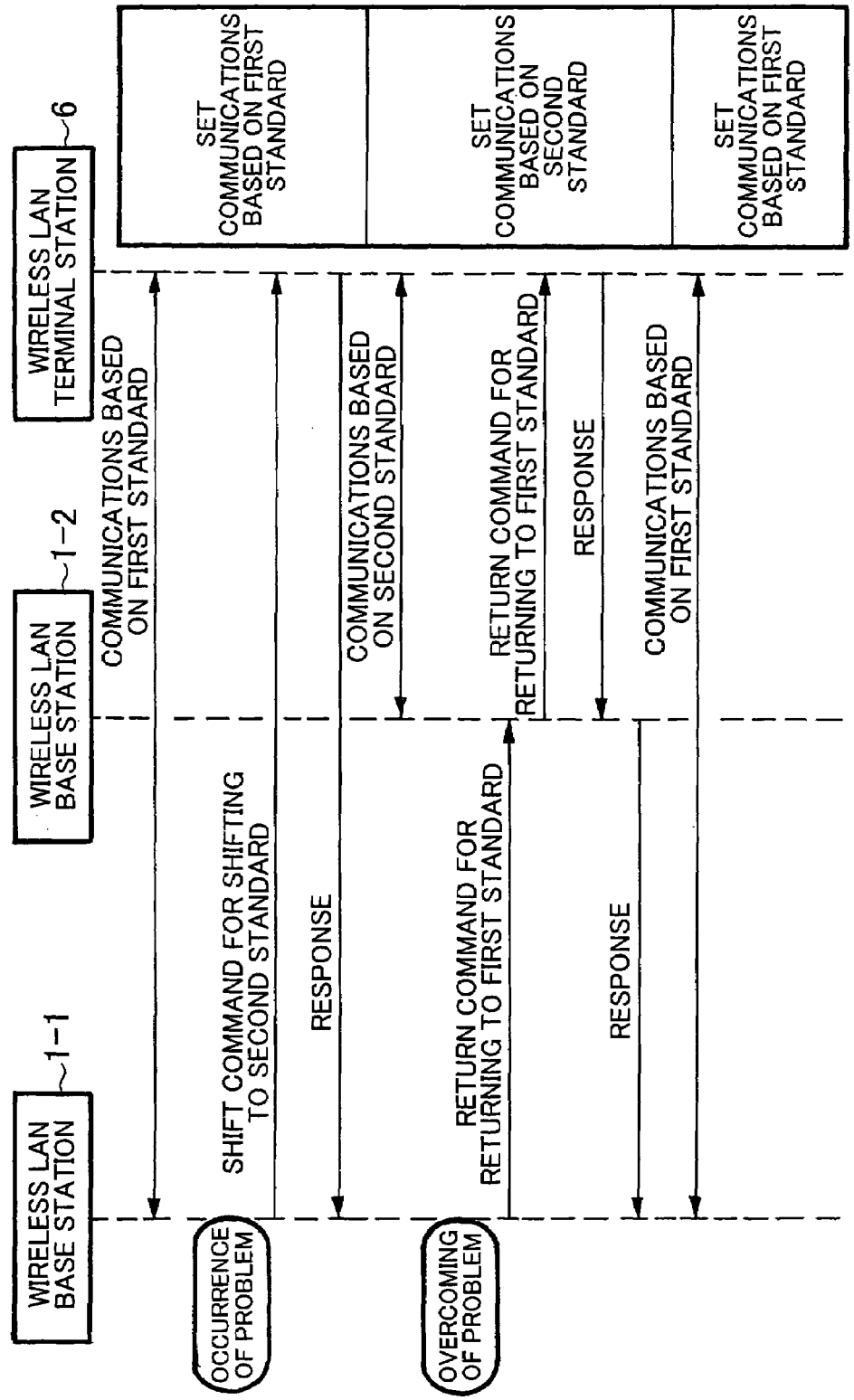
FIG. 6 is a diagram showing the operation of the wireless communication network system and the wireless communication terminal according to the fourth embodiment of the present invention.

In an fourth embodiment of the present invention, a further improvement is made to the wireless LAN base station. FIG. 5 shows the construction of the fourth embodiment, and FIG. 6 shows the flowchart. In FIG. 5, the same constituent elements as FIG. 1 are represented by the same reference numerals and the description thereof is omitted.

Wireless LAN base station 1-1 is a base station based on the first standard, and wireless LAN base station 1-2 is a base station based on the second standard.

The wireless LAN base station 1-1 and the wireless LAN base station 1-2 are connected to each other by a wired LAN via HUB (line concentrator for constructing star-type LAN) 9.

When the number of accommodated terminal stations of the wireless LAN base station 1-1 is increased and the communication efficiency is reduced, the wireless LAN base station 1-1 commands the wireless LAN terminal station 6 to shift to the second standard.

After responding to the wireless LAN base station 1-1, the wireless LAN terminal station 6 shifts to the second standard and communicates with the wireless LAN base station 1-2.

When the problem of the wireless LAN base station 1-1 is overcome, the wireless LAN base station 1-1 transmits a return command to the wireless LAN terminal station 6 through the wireless LAN base station 1-2 so that the wireless LAN terminal station 6 returns to the first standard.

After responding to the wireless LAN base station 1-2, the wireless LAN terminal station 6 returns to the first standard, and the wireless LAN base station 1-2 transmits a return response for return to the first standard to the wireless LAN base station 1-1, and the wireless LAN terminal station 6 resumes the communications with the wireless LAN base station 1-1.

As described above, according to this embodiment, the automatic matching between the wireless LAN standards can be performed even when there are equipped different wireless LAN base stations.

Furthermore, it is assumed in the above embodiment that the wireless LAN base station adapted to the first standard and the wireless LAN base station adapted to the second standard are equipped one by one. However, the same control as described above can be also performed when there may be equipped plural wireless LAN base stations which are adapted to each of the first and second standards.

Fifth Embodiment

Figure 7:
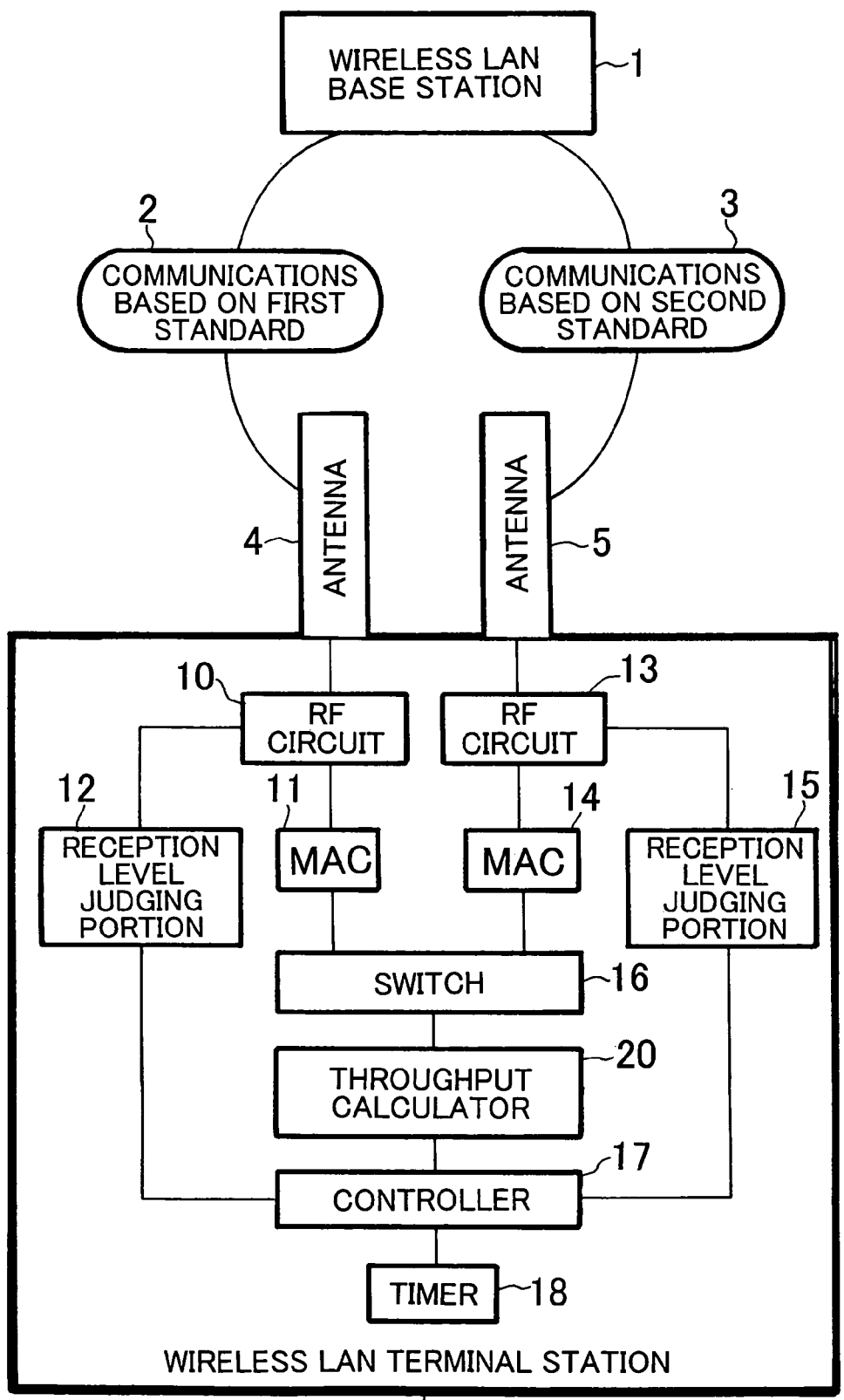
FIG. 7 is a block diagram showing a wireless communication network system and a wireless communication terminal according to a fifth embodiment of the present invention.

A fifth embodiment of the present invention has the same basic construction as the first embodiment except that it is further improved in high throughput. FIG. 7 shows the construction of the fifth embodiment. In FIG. 7, the same constituent elements as FIG. 1 are represented by the same reference numerals, and the description thereof is omitted.

In this embodiment, the wireless LAN terminal station 8 is equipped with throughput calculator 20 for calculating the throughput of the communications based on the first and second standards. It compares the throughput of the communications based on the first standard with the throughput of the communications based on the second standard, and carries out the communications based on the standard having a higher throughput. For example, when the communications based on the first standard is possible, but the throughput of the communications based on the second standard is higher than that based on the first standard, the communications are shifted to the communications based on the second standard by the switch 16.

Sixth Embodiment

Figure 8:
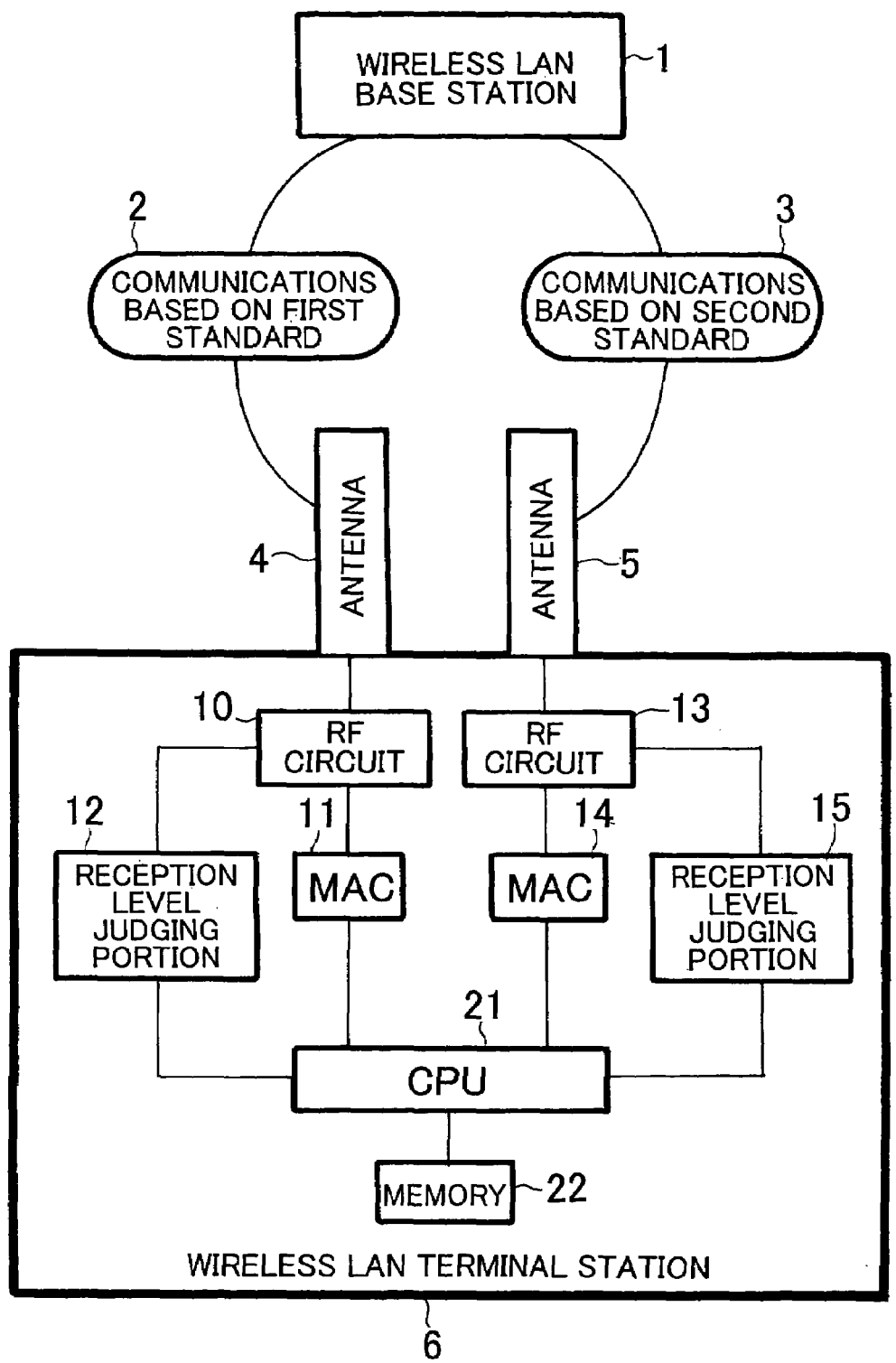
FIG. 8 is a block diagram showing a wireless communication network and a wireless communication terminal according to a sixth embodiment of the present invention.

According to a sixth embodiment of the present invention, the functions of the switch 16, the controller 17 and the timer 18 in FIG. 1 are implemented in a software style. FIG. 8 shows the construction of the sixth embodiment. In FIG. 8, the same constituent elements as FIG. 1 are represented by the same reference numerals, and the description thereof is omitted.

As shown in FIG. 8, the construction of this embodiment is equipped with CPU 21 and memory 22 such as ROM or the like in place of the switch 16, the controller 17 and the timer 18. A program described in the flowchart of FIG. 2 is stored in the memory 22, and CPU 21 controls the RF circuits 10, 13, the MAC circuits 11, 14 and the reception level judging portions 12, 15 according to the flowchart described in FIG. 2.

The construction of the wireless LAN base station usable in each of the embodiments described above will be described with reference to FIG. 9.

Figure 9:
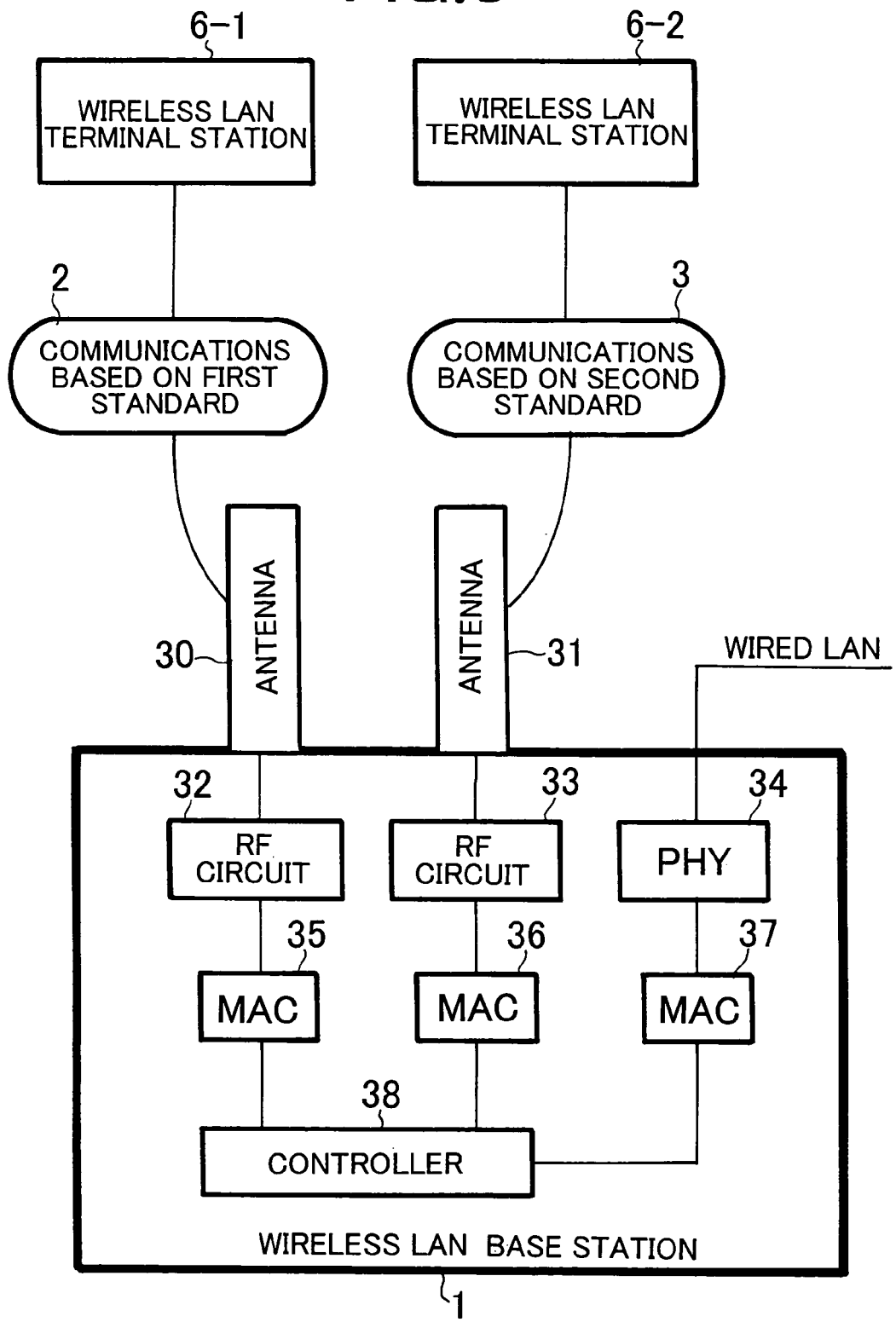
FIG. 9 is a block diagram showing a wireless base station and a wireless communication network system according to the present invention.

FIG. 9 shows a wireless communication network having wireless LAN terminal stations 6-1, 6-2 and a wireless LAN base station connected to these wireless LAN terminal stations. The wireless LAN base station 1 is equipped with antennas 30, 31 for carrying out the communications based on the first and second standards respectively, RF circuits 32, 33 connected to the antennas 30, 31 respectively, MAC circuits 35, 36 that carry out the processing of the wireless MAC layer and are connected to the RF circuits 32, 33 respectively, PHY (physical) 34 representing a transceiver of a physical layer for carrying out transmission/reception to/from wired LAN, MAC circuit 37 for carrying out the processing of a wireless MAC layer connected to PHY 34 and controller 38 for controlling the operation of the whole.

The RF circuit 32 and the RF circuit 33 are RF circuits for transmitting/receiving electric waves of wireless LAN communications based on the first and second standards respectively, and the MAC circuit 35 and the MAC circuit 36 are circuits for carrying out the MAC processing of the wireless LAN communications based on the first and second standards, respectively.

As shown in FIG. 9, the wireless LAN base station 1 carries out the communications based on the first standard with the wireless LAN terminal station 6-1, and also carries out the communications based on the second standard with the wireless LAN terminal station 6-2.

The controller 38 may be constructed by a dedicated control circuit, however, it may be constructed by CPU and a memory such as ROM or the like as shown in FIG. 8.

The number of accommodated terminal stations adapted to the first standard and the number of accommodated terminal stations adapted to the second standard are stored in the controller 38 of the wireless LAN base station 1. For example, assuming that thirty terminal stations are registered for the first standard and the communications are made with the wireless LAN terminal station 6-1 while five terminal stations are registered for the second standard and the communications are made with the wireless LAN terminal station 6-2, the communications based on the first standard is based on the upper-class standard and the communication rate is high. However, it has a number of terminal stations, and thus the communication efficiency thereof is actually low because of the collision between transmission packets, re-transmission or the like, so that the communication efficiency would be enhanced if the communications are shifted to the unoccupied second standard.

Since the throughput based on the first standard corresponds to the amount of packets passing between the MAC circuit 35 and the controller 38 and the throughput based on the second standard corresponds to the amount of packets passing between the MAC circuit 36 and the controller 38, the controller 38 knows the throughput based on the first standard and the throughput based on the second standard.

Figure 11:
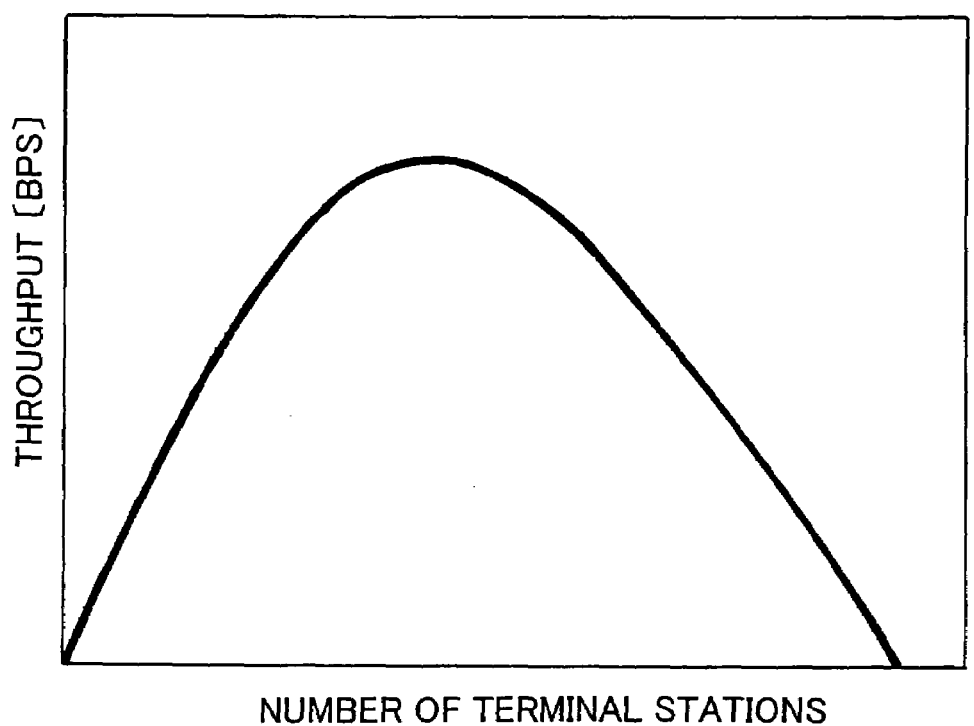
FIG. 11 is a diagram showing the relationship between the number of terminal stations and the throughput.

Here, the relationship between the number of terminal stations and the throughput is shown in FIG. 11. When the number of terminal stations is increased, the throughput between the MAC circuit 35 and the controller 38 is increased. However, if the number of terminal stations is excessively increased, the throughput would be reduced because of collision of transmission packets, re-transmission. The wireless LAN base station 1 registers the terminal stations in connection with the first standard, however, shifts the first standard to the second standard when the throughput is reduced.

The wireless base station 1 carries out an operation as shown in FIG. 4 or 6, for example, an operation of issuing to the wireless LAN terminal station 6-1 the shift command for shifting to the second standard when a trouble such as increase in the number of accommodated terminal stations adapted to the first standard, and outputting the return command for returning to the first standard when the problem is overcome as described with reference to FIG. 4. The program describing the operation of the base station as described in FIG. 4 or 6 is stored in the memory, and CPU controls the RF circuits 32, 33 and the MAC circuits 35, 36 according to the operation described in FIG. 4 or 6.

Figure 10:
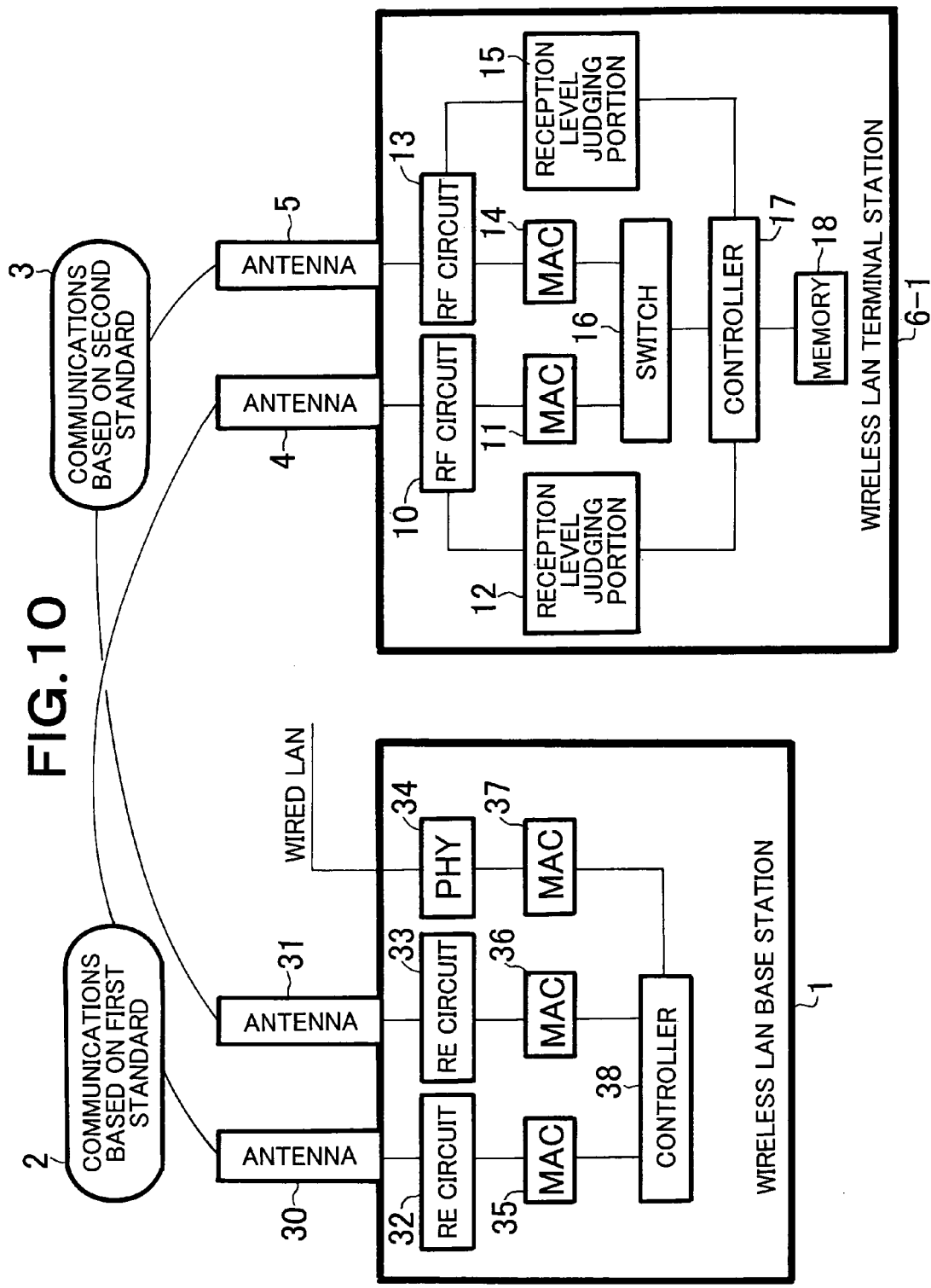
FIG. 10 is a diagram showing both the constructions of the wireless base station and the wireless communication terminal according to the present invention.

FIG. 10 shows both the constructions of the wireless LAN base station 1 and the wireless LAN terminal station 6-1. In this case, the construction shown in FIG. 1 is shown as the wireless LAN terminal station 6-1. The wireless LAN base station 1 carries out the transmission based on the first standard and the transmission based on the second standard through the antennas 30, 31, and the wireless LAN terminal station 6-1 carries out the reception level judgment by the operation of the first embodiment, and the communications based on the first standard and the communications based on the second standard are switched to each other.

As described above, according to the present embodiments, the following effects can be achieved.

According to a first effect, the wireless network is adapted to plural standards, so that even when a physical trouble occurs in a base station or terminal station module using one standard, the communications can be performed on the basis of another standard.

According to a second effect, the wireless network is adapted to plural standards, so that even when the intensity of received electric wave based on one standard is lowered, the communications can be performed on the basis of another standard.

According to a third effect, the wireless network is adapted to plural standards, so that even when an error occurs in the communications based on one standard, the communications can be performed on the basis of another standard.

What is claimed is:

1. A wireless communication network system comprising:
a wireless communication terminal that includes:
    antenna means for receiving signals based on plural wireless network standards;
    transmitting/receiving means for receiving the signals from said antenna means;
    switching means for switching the wireless network standards of the signals received by said transmitting/receiving means to one another;
    reception level judging means for judging the reception level of each of the signals received by said transmitting/receiving means in the priority order of the wireless network standards from the highest-priority wireless network standard to the lowest-priority wireless network standard in the plural wireless network standards; and
    control means for judging, on the basis of the judgment result of the reception level by said reception level judging means, whether it is possible to carry out communications based on any one of the plural wireless network standards, and controlling the switching operation of said switching means so that the communications based on the highest-priority wireless network standard can be carried out; and
a wireless base station which is capable of making communications based on the plural wireless network standards with said wireless communication terminal, and communicates with said wireless communication terminal on the basis of one of the plural wireless network standards, wherein when a problem occurs in the communications based on one of the plural wireless network standards between said wireless base station and said wireless communication terminal, said wireless base station transmits to said wireless communication terminal a shift command for shifting to communications based on another wireless network standard, and when the problem can be overcome, said wireless base station transmits to said wireless communication terminal a return command for returning to the communications based on the one of wireless network standards.

2. A wireless communication network system comprising:
a wireless communication terminal that includes:
    antenna means for receiving signals based on at least two wireless network standards;
    transmitting/receiving means for receiving the signals from said antenna means;
    switching means for switching the wireless network standards of the signals received by said transmitting/receiving means to one another;
    first reception level judging means for judging the reception level of a signal which is received by said transmitting/receiving means and based on a first wireless network standard having the highest priority in the two wireless network standards;
    second reception level judging means for judging the reception level of another signal which is received by said transmitting/receiving means and based on a second wireless network standard having a priority lower than the first wireless network standard; and
    control means for judging, on the basis of the judgment result of the reception level by said first reception level judging means, whether it is possible to carry out communications based on the first wireless network standard, judging, on the basis of the judgment result of the reception level by said second reception level judging means, whether it is possible to carry out communications based on the second wireless network standard when it is judged that it is impossible to carry out the communications based on the first wireless network standard, and controlling the switching operation of said switching means so that communications based on a wireless network standard having the highest priority can be carried out; and
a wireless base station which is capable of making communications based on the two wireless network standards with said wireless communication terminal, and communicates with said wireless communication terminal on the basis of one of the two wireless network standards, wherein when a problem occurs in the communications based on one of the two wireless network standards between said wireless base station and said wireless communication terminal, said wireless base station transmits to said wireless communication terminal a shift command for shifting to communications based on the other wireless network standard, and when the problem can be overcome, said wireless base station transmits to said wireless communication terminal a return command for returning to the communications based on the one of two wireless network standards.

3. A wireless communication network system comprising:
a wireless communication terminal that includes:
    antenna means for receiving signals based on plural wireless network standards;
    transmitting/receiving means for receiving the signals from said antenna means;
    switching means for switching the wireless network standards of the signals received by said transmitting/receiving means to one another;
    reception level judging means for judging the reception level of each of the signals received by said transmitting/receiving means in the priority order of the wireless network standards from the highest-priority wireless network standard to the lowest-priority wireless network standard in the plural wireless network standards; and
    control means for judging, on the basis of the judgment result of the reception level by said reception level judging means, whether it is possible to carry out communications based on any one of the plural wireless network standards, and controlling the switching operation of said switching means so that the communications based on the highest-priority wireless network standard can be carried out;
a first wireless base station for carrying out communications based on one of the plural wireless network standards with said wireless communication terminal; and a second wireless base station for carrying out communications based on another wireless network standard of the plural wireless network standards with said wireless communication terminal, wherein when a problem occurs in communications based on the one wireless network standard with the wireless communication terminal, said first wireless base station transmits to said wireless communication terminal a shift command for shifting to the communications based on the another wireless network standard with said second wireless base station, and when the problem is overcome, said first wireless base station transmits to said second wireless base station a first return command for returning to the communications based on the one wireless network standard, and also upon receiving the first return command, said second wireless base station transmits to said wireless communication terminal a second return command for returning to the communications based on the one wireless network standard with said first wireless base station.

4. A wireless communication network system comprising:
a wireless communication terminal that includes:
   antenna means for receiving signals based on at least two wireless network standards;
   transmitting/receiving means for receiving the signals from said antenna means;
   switching means for switching the wireless network standards of the signals received by said transmitting/receiving means to one another;
   first reception level judging means for judging the reception level of a signal which is received by said transmitting/receiving means and based on a first wireless network standard having the highest priority in the two wireless network standards;
   second reception level judging means for judging the reception level of another signal which is received by said transmitting/receiving means and based on a second wireless network standard having a priority lower than the first wireless network standard; and
   control means for judging, on the basis of the judgment result of the reception level by said first reception level judging means, whether it is possible to carry out communications based on the first wireless network standard, judging, on the basis of the judgment result of the reception level by said second reception level judging means, whether it is possible to carry out communications based on the second wireless network standard when it is judged that it is impossible to carry out the communications based on the first wireless network standard, and controlling the switching operation of said switching means so that communications based on a wireless network standard having the highest priority can be carried out;
a first wireless base station for carrying out communications based on one of the two wireless network standards with said wireless communication terminal; and
a second wireless base station for carrying out communications based on the other wireless network standard of the two wireless network standards with said wireless communication terminal, wherein when a problem occurs in communications based on the one wireless network standard with the wireless communication terminal, said first wireless base station transmits to said wireless communication terminal a shift command for shifting to the communications based on the other wireless network standard with said second wireless base station, and when the problem is overcome, said first wireless base station transmits to said second wireless base station a first return command for returning to the communications based on the one wireless network standard, and also upon receiving the first return command, said second wireless base station transmits to said wireless communication terminal a second return command for returning to the communications based on the one wireless network standard with said first wireless base station.

5. A wireless communication network system comprising:
a wireless communication terminal that includes:
   a plurality of antennas configured to receive a plurality of signals based on a plurality of wireless network standards;
   a plurality of transmitting/receiving units respectively configured to receive the signals from the plurality of antennas;
   a switching unit configured to switch the wireless network standards of the signals received by the transmitting/receiving units to one another;
   a plurality of reception level judging units configured to judge the reception level of each of the signals received by the transmitting/receiving units in the priority order of the wireless network standards from the highest-priority wireless network standard to the lowest-priority wireless network standard in the plural wireless network standards; and
   a control unit configured to judge, on the basis of the judgment result of the reception levels by the reception level judging units, whether it is possible to carry out communications based on any one of the plural wireless network standards, and to control the switching operation of the switching unit so that the communications based on the highest-priority wireless network standard can be carried out; and
a wireless base station which is capable of making communications based on the plural wireless network standards with said wireless communication terminal, and communicates with said wireless communication terminal on the basis of one of the plurality of wireless network standards, wherein when a problem occurs in the communications based on one of the plurality of wireless network standards between the wireless base station and the wireless communication terminal, the wireless base station transmits to the wireless communication terminal a shift command for shifting to communications based on another wireless network standard, and when the problem can be overcome, the wireless base station transmits to the wireless communication terminal a return command for returning to the communications based on the one of the plurality of wireless network standards.

6. A wireless communication network system comprising:
a wireless communication terminal that includes:
   a plurality of antennas configured to receive signals based on at least two wireless network standards;
   a plurality of transmitting/receiving units respectively configured to receive the signals from the plurality of antennas;
   a switching unit configured to switch the wireless network standards of the signals received by the transmitting/receiving units to one another;
   a first reception level judging unit configured to judge the reception level of a signal which is received by the plurality of transmitting/receiving units and based on a first wireless network standard having the highest priority in the two wireless network standards;

a second reception level judging unit configured to judge the reception level of another signal which is received by the plurality of transmitting/receiving units and based on a second wireless network standard having a priority lower than the first wireless network standard; and a control unit configured to judge, on the basis of the judgment result of the reception level by the first reception level judging unit, whether it is possible to carry out communications based on the first wireless network standard, to judge, on the basis of the judgment result of the reception level by the second reception level judging unit, whether it is possible to carry out communications based on the second wireless network standard when it is judged that it is impossible to carry out the communications based on the first wireless network standard, and to control the switching operation of the switching unit so that communications based on a wireless network standard having the highest priority can be carried out; and a wireless base station which is capable of making communications based on the two wireless network standards with the wireless communication terminal, and to communicate with the wireless communication terminal on the basis of one of the two wireless network standards, wherein when a problem occurs in the communications based on one of the two wireless network standards between the wireless base station and the wireless communication terminal, the wireless base station transmits to the wireless communication terminal a shift command for shifting to communications based on the other wireless network standard, and when the problem can be overcome, the wireless base station transmits to the wireless communication terminal a return command for returning to the communications based on the one of two wireless network standards.

7. A wireless communication network system comprising:

a wireless communication terminal that includes:

a plurality of antennas configured to receive a plurality of signals based on a plurality of wireless network standards;

a plurality of transmitting/receiving units respectively configured to receive the signals from the plurality of antennas;

a switching unit configured to switch the wireless network standards of the signals received by the transmitting/receiving units to one another;

a plurality of reception level judging units configured to judge the reception level of each of the signals received by the transmitting/receiving units in the priority order of the wireless network standards from the highest-priority wireless network standard to the lowest-priority wireless network standard in the plural wireless network standards; and a control unit configured to judge, on the basis of the judgment result of the reception levels by the reception level judging units, whether it is possible to carry out communications based on any one of the plural wireless network standards, and to control the switching operation of the switching unit so that the communications based on the highest-priority wireless network standard can be carried out;

a first wireless base station for carrying out communications based on one of the plural wireless network standards with said wireless communication terminal; and a second wireless base station for carrying out communications based on another wireless network standard of the plural wireless network standards with said wireless communication terminal, wherein when a problem occurs in communications based on the one wireless network standard with the wireless communication terminal, said first wireless base station transmits to said wireless communication terminal a shift command for shifting to the communications based on the another wireless network standard with said second wireless base station, and when the problem is overcome, said first wireless base station transmits to said second wireless base station a first return command for returning to the communications based on the one wireless network standard, and also upon receiving the first return command, said second wireless base station transmits to said wireless communication terminal a second return command for returning to the communications based on the one wireless network standard with said first wireless base station.

8. A wireless communication network system comprising:

a wireless communication terminal that includes:

a plurality of antennas configured to receive signals based on at least two wireless network standards;

a plurality of transmitting/receiving units respectively configured to receive the signals from the plurality of antennas;

a switching unit configured to switch the wireless network standards of the signals received by the transmitting/receiving units to one another;

a first reception level judging unit configured to judge the reception level of a signal which is received by the plurality of transmitting/receiving units and based on a first wireless network standard having the highest priority in the two wireless network standards;

a second reception level judging unit configured to judge the reception level of another signal which is received by the plurality of transmitting/receiving units and based on a second wireless network standard having a priority lower than the first wireless network standard; and a control unit configured to judge, on the basis of the judgment result of the reception level by the first reception level judging unit, whether it is possible to carry out communications based on the first wireless network standard, to judge, on the basis of the judgment result of the reception level by the second reception level judging unit, whether it is possible to carry out communications based on the second wireless network standard when it is judged that it is impossible to carry out the communications based on the first wireless network standard, and to control the switching operation of the switching unit so that communications based on a wireless network standard having the highest priority can be carried out;

a first wireless base station for carrying out communications based on one of the two wireless network standards with said wireless communication terminal; and a second wireless base station for carrying out communications based on the other wireless network standard of the two wireless network standards with said wireless communication terminal, wherein when a problem occurs in communications based on the one wireless network standard with the wireless communication terminal, said first wireless base station transmits to said wireless communication terminal a shift command for shifting to the communications based on the other wireless network standard with said second wireless base station, and when the problem is overcome, said first wireless base station transmits to said second wireless base station a first return command for returning to the communications based on the one wireless network standard, and also upon receiving the first return command, said second wireless base station transmits to said wireless communication terminal a second return command for returning to the communications based on the one wireless network standard with said first wireless base station.

* * * * *